(No Model.) 7 Sheets—Sheet 1.

F. MAYER.
APPARATUS FOR MANUFACTURING GAS.

No. 523,224. Patented July 17, 1894.

WITNESSES:
Dan'l Fisher
George Hemsley

Frederick Mayer,
INVENTOR
BY [signature]
ATTORNEYS.

(No Model.) 7 Sheets—Sheet 2.

F. MAYER.
APPARATUS FOR MANUFACTURING GAS.

No. 523,224. Patented July 17, 1894.

WITNESSES:
Dan'l Fisher
George Hemsley

Frederick Mayer,
INVENTOR
BY Geo. W. J. Howard,
ATTORNEYS.

(No Model.) 7 Sheets—Sheet 3.
F. MAYER.
APPARATUS FOR MANUFACTURING GAS.
No. 523,224. Patented July 17, 1894.
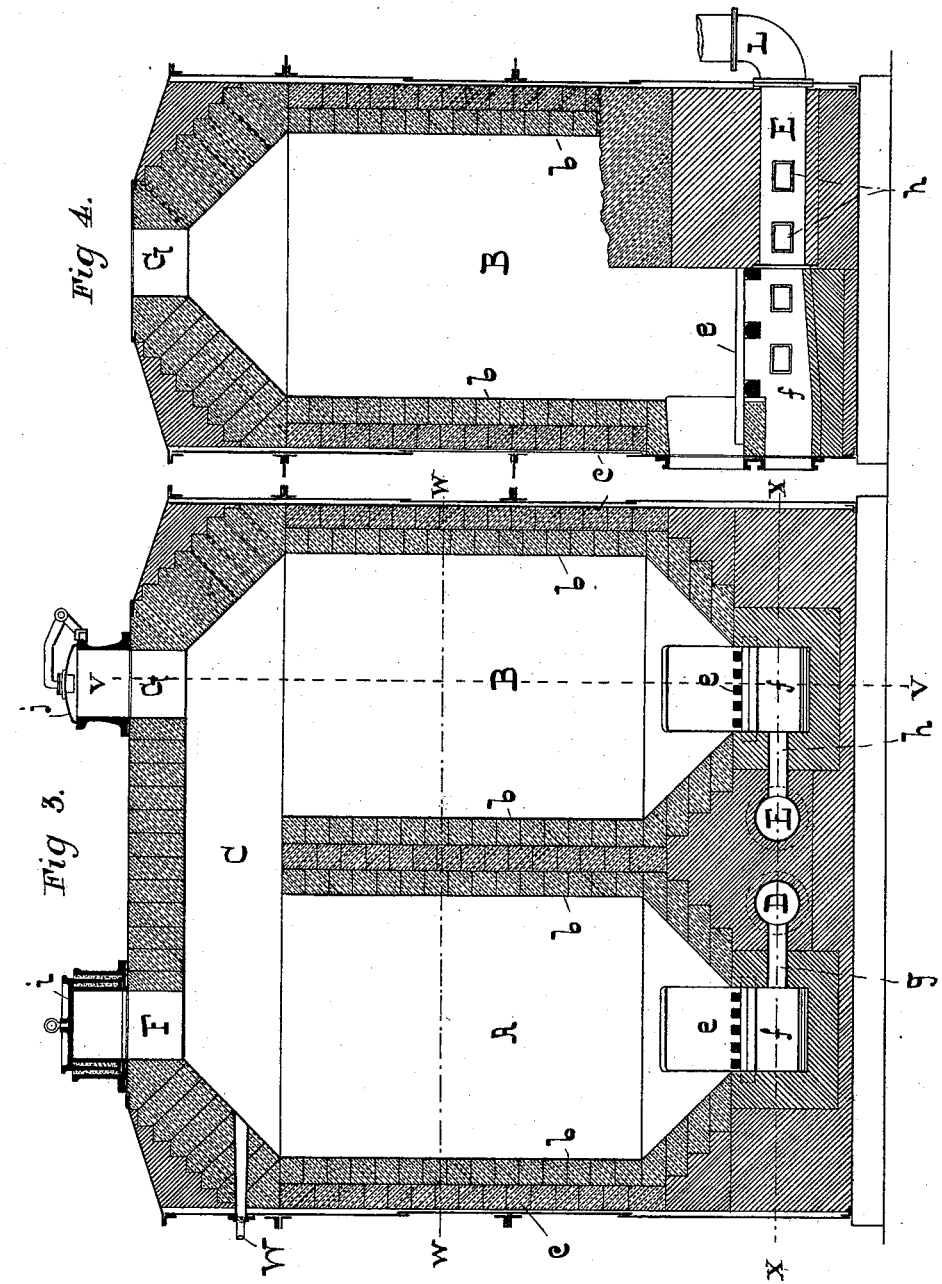
WITNESSES:
Dan'l Fisher
George Hemsley
Frederick Mayer,
INVENTOR
BY
ATTORNEYS.

(No Model.)　　　　　　　　　　　　　　　　　　7 Sheets—Sheet 4.
F. MAYER.
APPARATUS FOR MANUFACTURING GAS.

No. 523,224.　　　　　　　　　　Patented July 17, 1894.

WITNESSES:
Dan'l Fisher
George Hemsley

Frederick Mayer,
INVENTOR
BY G.H. W.T. Howard,
ATTORNEYS.

THE NORRIS PETERS CO., PHOTO-LITHO., WASHINGTON, D. C.

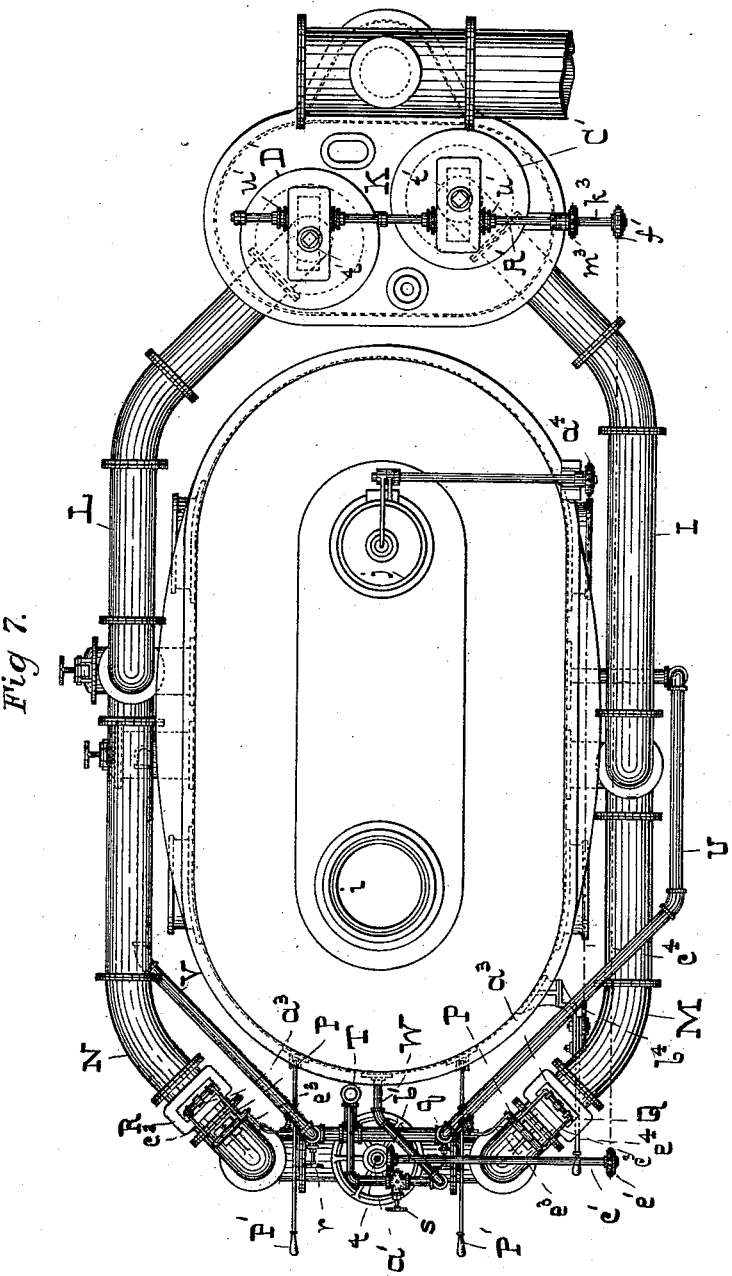

(No Model.) 7 Sheets—Sheet 6.
F. MAYER.
APPARATUS FOR MANUFACTURING GAS.
No. 523,224. Patented July 17, 1894.
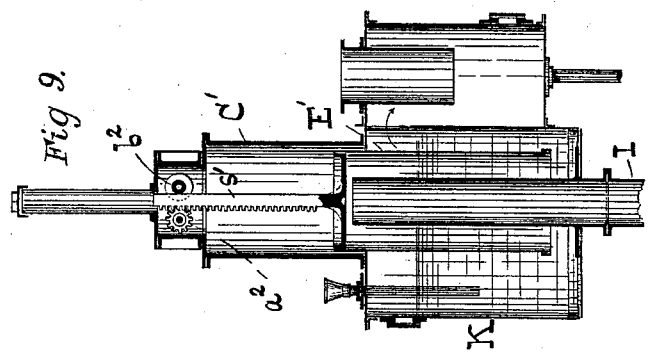
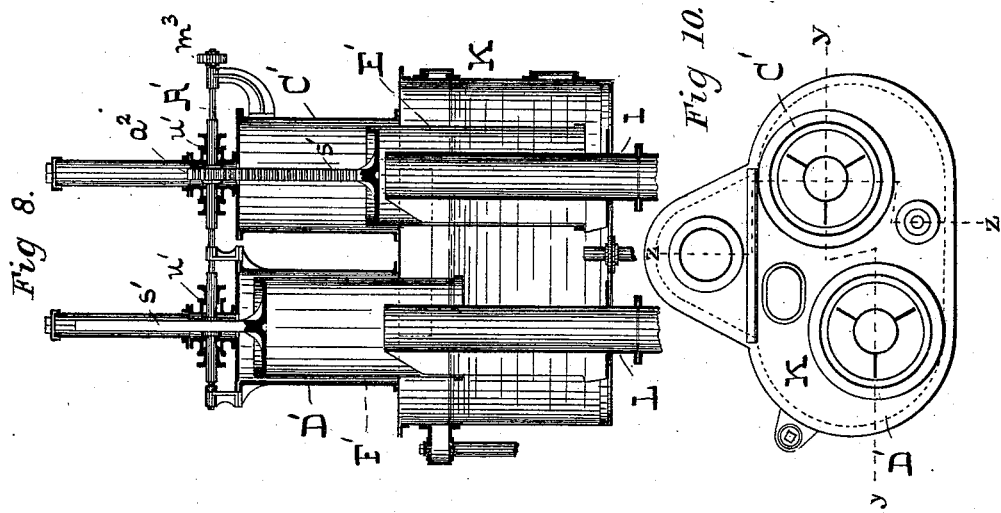
WITNESSES:
Dan'l Fisher
George Hemsley
INVENTOR
Frederick Mayer
BY G.H. & W.J. Howard
ATTORNEYS.

(No Model.) 7 Sheets—Sheet 7.
F. MAYER.
APPARATUS FOR MANUFACTURING GAS.
No. 523,224. Patented July 17, 1894.
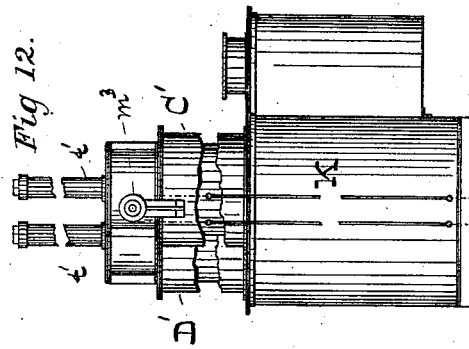
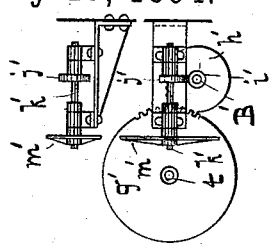
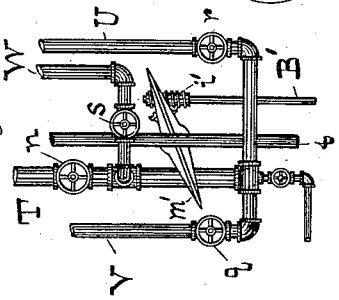
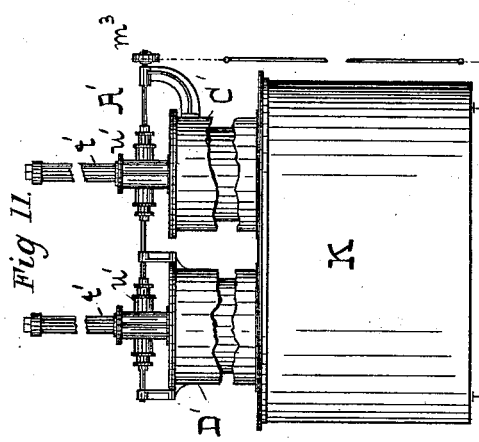
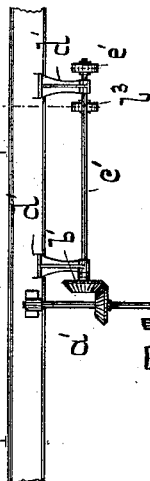
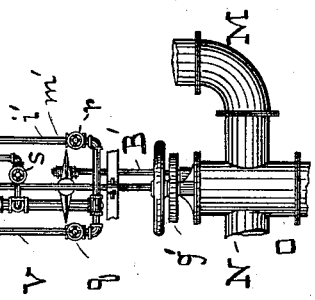
WITNESSES:
Dan'l Fisher
George Hemsley
Frederick Mayer
INVENTOR
BY W. J. Howard
ATTORNEYS.

UNITED STATES PATENT OFFICE.

FREDERICK MAYER, OF BALTIMORE, MARYLAND.

APPARATUS FOR MANUFACTURING GAS.

SPECIFICATION forming part of Letters Patent No. 523,224, dated July 17, 1894.

Application filed January 31, 1894. Serial No. 498,567. (No model.)

*To all whom it may concern:*

Be it known that I, FREDERICK MAYER, of the city of Baltimore and State of Maryland, have invented certain Improvements in Apparatus for Manufacturing Gas, of which the following is a specification.

In the description of the said invention which follows, reference is made to the accompanying drawings forming a part hereof, and in which—

Figure 1:
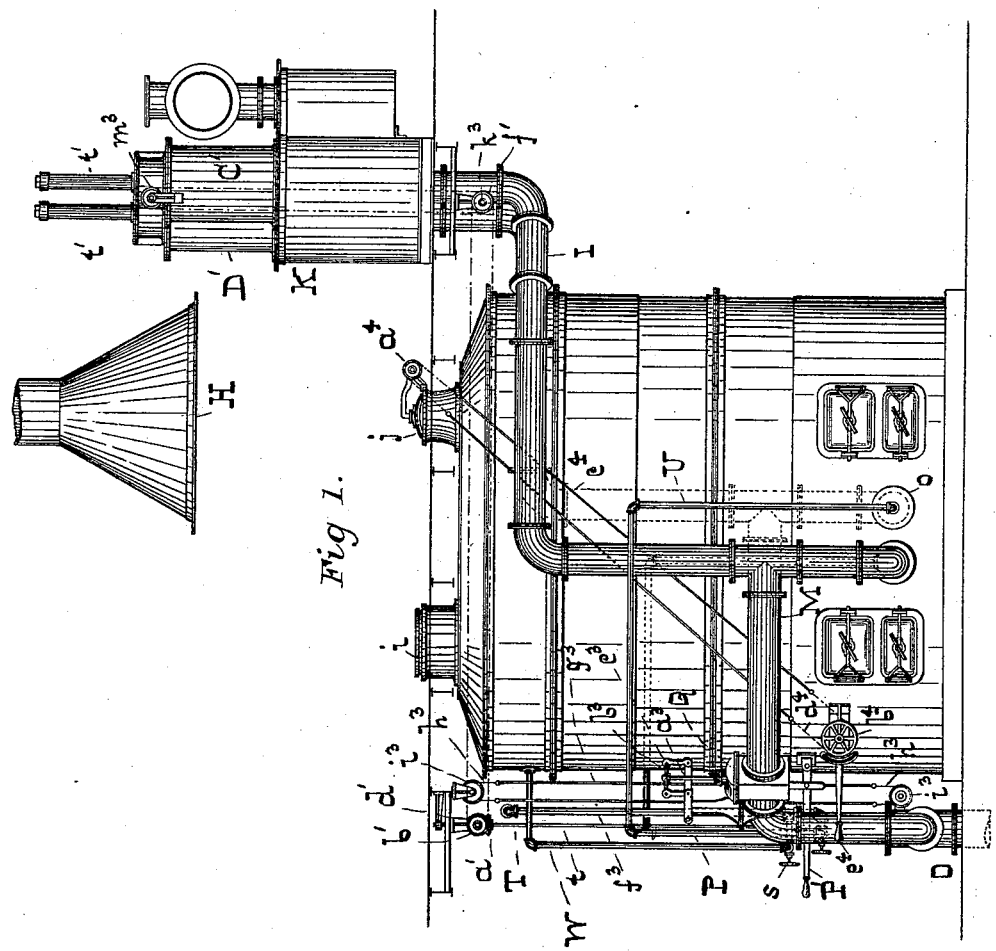
Figure 2:
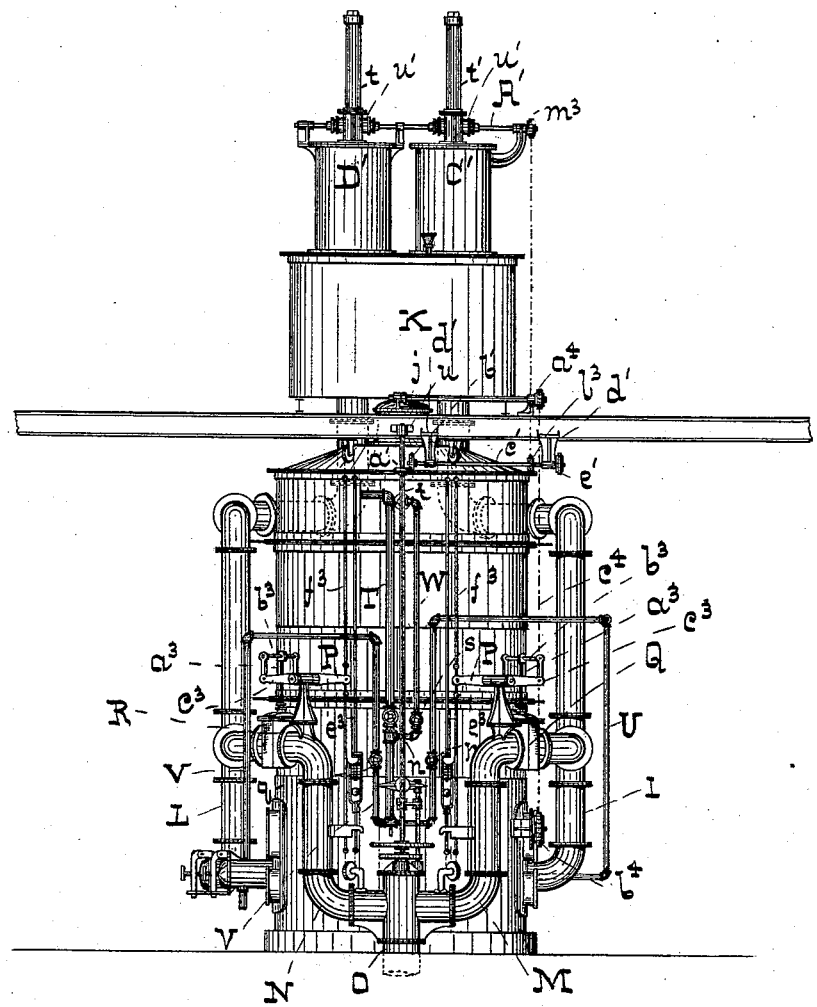
Figure 5:
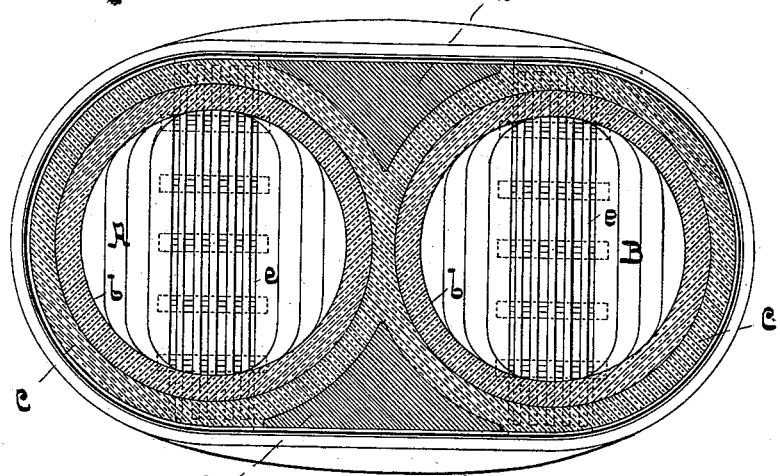
Figure 6:
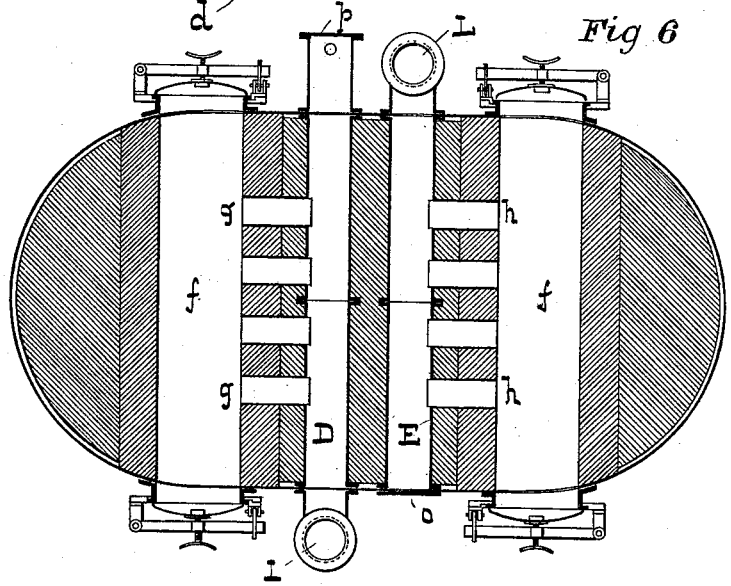

Figure 1 is an exterior front elevation of the apparatus. Fig. 2 is an exterior end elevation. Fig. 3 is an enlarged longitudinal central sectional elevation of the same. Fig. 4 is a transverse section of Fig. 3 taken on the dotted line $v$—$v$. except that a part of a conduit, hereinafter described and the adjacent brick wall, are shown in section. Fig. 5 is a sectional plan of Fig. 3 taken on the dotted line $w$—$w$. Fig. 6 is a similar section of Fig. 3 taken on the dotted line $x$—$x$. Fig. 7 is an exterior plan of the apparatus. Figs. 8 to 14 inclusive, are details of the apparatus on an enlarged scale.

Referring to the drawings, A and B are circular twin generators. The wall of the generators is formed of brick of different qualities, the inner circular shell $b$ being of fire brick of the highest grade, the outer circular shell $c$ of a cheaper grade, and the filling-in $d$ of common brick. The entire wall is encased in sheet iron. The portion of the wall situated between the generators is cut away to form the connecting space C, see Fig. 3. At the bottom of each generator are grate bars $e$, and below these bars are ash pits $f$.

D and E are conduits extending transversely through the brick work near its bottom, and the ash pits $f$, and these conduits are connected by ducts $g$ and $h$.

The generator A has a feed opening F covered by a valve $i$, which is sand sealed, and the generator B has a similar opening G, provided with a purge valve $j$ over which is suspended a hood H shown only in Fig. 1. The purge valve is manipulated through the medium of sprocket wheels $a^4$ and $b^4$, rods $c^4$ connected at their ends by chains $d^4$, and the lever $e^4$ on the shaft of the sprocket wheel $b^4$.

I is a pipe leading from the conduit D into the hydraulic main K, see Figs. 8 and 9.

L is a pipe similar to the one I, leading from the conduit E on the opposite side of the generator to the hydraulic main, see particularly Figs. 2 and 7.

M and N are branch pipes leading, respectively, from the pipes I and L, to the main blast pipe O which extends to some source of supply of air under pressure.

Q and R are stop valves respectively in the pipes M and N. These valves are best shown in Figs. 2 and 7. The stem $a^3$ of each of the valves Q and R is attached to a spindle, $b^3$ united to a double or branched arm $c^3$ of a lever P, the other arm $e^3$ of which is loosely connected to a vertical rod $f^3$. A similar rod $g^3$ is attached at the upper and lower ends to the one $f^3$ by chains $h^3$ which pass over sheaves $i^3$, thus making an endless connection. The rod $g^3$ is operated by a hand lever P' hinged to the sheet iron casing around the brick work of the generators.

T is a main steam pipe leading from a boiler not shown, to the main steam valve $n$; and U and V are branch steam pipes extending from the main steam pipe T below the valve $n$, to the ends of the conduits D and E which are opposite to the pipes I and L, and which are closed by heads $o$ and $p$, see Fig. 7. The valves in the steam pipes U and V are, respectively, denoted by $q$ and $r$.

W is a purge steam pipe, controlled by a valve $s$, branching from the main steam pipe T, and leading to the upper part of the interior of the generator A see Fig. 3.

A shaft $t$ stepped in the head of the main blast pipe O, extends upward to a point above the generators where it enters a suitable bearing box $u$, and it carries a beveled gear wheel $a'$ in engagement with a similar wheel $b'$ on a counter shaft $c'$ hung in brackets $d'$. At the outer end of the counter shaft $c'$ is a sprocket wheel $e'$ united by a chain belt to a similar sprocket wheel $f'$ on a stud $k^3$ having a second sprocket wheel $l^3$ united by a chain belt to the sprocket wheel $m^3$ on a spindle A', which serves to operate the dip valves in the hydraulic main K as hereinafter described.

B' is a short, vertical revoluble shaft situated near the shaft $t$ and connected to the said shaft by means of two spur gears $g'$ and $h'$, see particularly Figs. 11, 12, and 13. At the upper end of the short shaft B' is a worm $i'$ in gear with a toothed sector $j'$ on a rockshaft $k'$ having a double pointer $m'$, see Figs. 11, 12 and 13. The pointer $m'$ when in a horizontal position, is either below the valves $q$ and $r$, as shown in Fig. 2, or above them as shown in Fig. 11. When, however, the pointer is inclined in either direction to its fullest extent, it indicates one of the valves $q$ and $r$ as hereinafter fully described.

Referring to Figs. 8 and 9, it will be seen that the pipes I and L in the hydraulic main K extend through the contained water into cylindrical boxes $C'$ and $D'$, in which the dip valves $E'$ and $F'$, before alluded to, are situated. Fig. 8 is a section of Fig. 10 taken on the dotted line $y$—$y$. Fig. 9 is a section of Fig. 10 taken on the dotted line $z$—$z$. These dip valves $E'$ and $F'$ which cover the pipes I and L consist of cylindrical shells closed at the top, and at the bottom immersed in the water of the hydraulic main, see Figs. 8 and 9. Extending from the dip valves $E'$ and $F'$ are racks $S'$ which pass through the heads of the cylindrical extensions $C'$ and $D'$ of the hydraulic main K and into closed tubular cases $t'$. The spindle $A'$ before alluded to, passes through the bases of the tubular cases $t'$ which are enlarged and provided with stuffing boxes $u'$ to prevent leakage of gas. Within the enlarged portions of the cases $t'$, are pinions $a^2$ secured to the spindle $A'$ and in engagement with the racks $s'$ see Figs. 8 and 9.

Referring now particularly to Fig. 10 which is a plan of Fig. 8, it will be seen that the pipes I and L with their dip valves $E'$ and $F'$ are not situated on the longitudinal center line of the hydraulic main, but are placed one on each side thereof. The object of this arrangement is to have the pinions $a^2$ on opposite sides of the racks so that in the rotation of the spindle $A'$ one of the valves will be raised as the other is lowered. At the back of each rack $s'$ is a supporting roll $b^2$ which prevents the rack from being forced back in the operation of the spindle $A'$, see Fig. 9.

Supposing the feed and purge valves $i$ and $j$ to be open, the steam valves closed, and the dip valves $E'$ and $F'$ in the hydraulic main equalized in height, the first step in making gas consists in charging the generators with lump anthracite coal, coke or other carbonaceous material through the openings F and G, and bringing the coal to an incandescent state by the air blast admitted to under the grates, through the pipes M and N, and conduits D and E. The air blast is now shut off, the openings F and G closed, and the dip valves $E'$ and $F'$ brought into the relative positions shown in Fig. 8, when the main steam valve $n$ and the branch steam valve $r$ are opened, which admit steam to the generator A by means of the conduit D and the ducts $g$. The steam passes upward through the incandescent coal in the generator A and in this operation is disassociated into its elements the oxygen combining with the coal forming carbonic-oxide and the hydrogen being liberated. These gases then pass through the connecting space C to the generator B, thence through the incandescent coal in the said generator, thence to the conduit E by means of the ducts $h$ and thence to the pipe L through which they are conducted to under the dip valve $F'$, and are delivered through the water to the hydraulic main. The operation as described is continued until the coal in the generator A becomes somewhat cooled, when the steam valve $r$ is closed and the dip valves $E'$ and $F'$ reversed in position. The steam valve $q$ is now opened, and the operation above described repeated, except that the process is reversed the steam passing upward through the generator B and downward through the one A but the gases finally pass from under the dip valve $E'$ to the hydraulic main, as in the first operation. This secondary process is continued until the coal in the generator B has been cooled to a point below which the operation cannot be properly worked, when the steam valve $r$ is closed. The purge valve $j$ is now opened, as are also both the steam valves $q$ and $r$ to drive out through the opening G, the inflammable gases contained in the generators. This purging process is completed after the closing of the steam valves $q$ and $r$ by admitting steam through the purge pipe W. The purge being still open the air blast to both generators is turned on, and this is continued until the coal in both generators is again heated to an incandescent state or a proper temperature after which the first and secondary processes as described are repeated.

It will be understood from the foregoing description that in operating the dip valves $E'$ and $F'$ in the hydraulic main, to change them from one extreme position to another, or to bring them to a common position wherein the depth of dip is equal, the double pointer $m'$ is also and simultaneously moved, in other words, all move together. For instance, when the said dip valves are equalized in height or have the same dip, the pointer is in a horizontal position which indicates to the attendant that the apparatus is in a condition for the application of the blast, the dip valves both offering by the depth of seal sufficient resistance to the escape of air to prevent its passing to the take-off pipe of the hydraulic main, and also, to prevent the backward passage or return of gas from the hydraulic main to the generators. It also indicates that both the steam valves $q$ and $r$ should be or are closed.

In adjusting the valve operating mechanism by means of the hand wheel so as to open, or elevate to its highest position, the dip valve $F'$, the pointer $m'$ is automatically moved so as to point to the steam valve $r$, and by this, the attendant knows that the steam valve $r$ must be opened in order that the gas making process may be carried out. To effect the secondary process, the hand wheel is turned in an opposite direction so as to lower the dip valve $F'$ and raise the one $E'$ and at the same time the steam valve $r$ is closed. The position of the pointer now indicates that the steam valve $q$ is to be opened. Thus, the pointer always indicates the position of the dip valves, and shows which steam valve has to be opened.

I claim as my invention—

1. In a gas making apparatus, twin generators having two conduits which extend through the brick-work thereof, and are in communication with blast pipes, the said conduits having ducts which connect them with the generators, a gas pipe leading from each conduit to a hydraulic main, a system of steam pipes whereby steam may be introduced into the said conduits alternately, vertically moving dip valves in the hydraulic main and mechanism to connect the dip valves whereby on the elevation of one valve the other is depressed or lowered, combined substantially as specified.

2. In a gas making apparatus, twin generators having conduits adapted to receive an air blast situated in the brick-work of the generators, the said conduits having ducts which connect them with the generators, gas pipes leading from the conduits to the hydraulic main, a system of steam pipes whereby steam may be introduced into the conduits alternately, vertically moving dip valves in the hydraulic main, mechanism to unite the dip valves whereby in the raising of one dip valve the other is lowered, and an indicator or a pointer having a movement in common with the dip valves to indicate their positions in the hydraulic main, combined substantially as specified.

3. In a gas making apparatus, twin generators having conduits adapted to receive an air blast and in communication with the generators by means of ducts, gas pipes leading from the conduits to a hydraulic main, a system of steam pipes whereby steam may be introduced to the conduits alternately, controlling valves in the steam pipes, dip valves in the hydraulic main, connecting mechanism which unites the dip valves and whereby the same are moved in opposite directions, a pointer having a movement in common with the dip valves arranged to indicate their positions and also to indicate which controlling steam valve is to be opened at certain stages of the gas making operation, combined substantially as specified.

4. In a gas making apparatus, twin generators each having a conduit adapted to receive an air blast and in communication with the generator, a gas pipe leading from each conduit to a hydraulic main and controlled by a dip valve, and a system of steam pipes whereby steam may be introduced into the said conduits and thence through the generators to the said hydraulic main, combined substantially as specified.

5. In a gas making apparatus, the combination with two generators and a hydraulic main, a gas pipe leading from the bottom of each generator and underneath the fuel therein, to the hydraulic main and through the water in the said main to a point somewhat above the water level, dip valves which at all times cover the gas pipes and are sealed by the water, and mechanism whereby the dip valves are moved together, vertically, but in opposite directions, whereby the relative resistance offered by the two valves to the passage of gas from the two generators may be changed or the resistance equalized, substantially as, and for the purpose specified.

6. In a gas making apparatus, the combination with two generators and a hydraulic main, a gas pipe leading from the bottom of each generator and underneath the fuel therein to the hydraulic main, and in communication with the air blast pipe, dip valves which at all times cover the gas pipes and are sealed by water, and mechanism whereby the dip valves are moved together, vertically, but in opposite directions, whereby the relative resistance offered by the two valves to the passage of gas from the two generators may be changed or the resistance equalized, substantially as, and for the purpose specified.

7. In a gas making apparatus, the combination with two generators and a hydraulic main, a gas pipe leading from the bottom of each generator and underneath the fuel therein to the hydraulic main, and through the water in the main to a point somewhat above the water line, two dip valves having actuating racks situated in reverse positions, a spindle, and pinions on the spindle, in engagement with the said racks, whereby in the revolution of the spindle, one valve is raised and the other lowered, substantially as, and for the purpose specified.

FREDERICK MAYER.

Witnesses:
GEO. E. TAYLOR,
DANL. FISHER.